United States Patent
Ding

(10) Patent No.: US 11,435,068 B1
(45) Date of Patent: Sep. 6, 2022

(54) TELESCOPIC PLANT LIGHT

(71) Applicant: Huizhou Hongrui Photoelectric Technology Co., Ltd., Guangdong (CN)

(72) Inventor: Yu Lin Ding, Boluo County (CN)

(73) Assignee: HUIZHOU HONGRUI PHOTOELECTRIC TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/362,910

(22) Filed: Jun. 29, 2021

(30) Foreign Application Priority Data

Mar. 9, 2021 (CN) .......................... 202120496943.3

(51) Int. Cl.
| | |
|---|---|
| *F21V 21/24* | (2006.01) |
| *F21S 4/28* | (2016.01) |
| *A01G 9/24* | (2006.01) |
| *F21V 23/00* | (2015.01) |
| *F21V 29/50* | (2015.01) |

(52) U.S. Cl.
CPC .............. *F21V 21/24* (2013.01); *A01G 9/249* (2019.05); *F21S 4/28* (2016.01); *F21V 23/007* (2013.01); *F21V 29/50* (2015.01)

(58) Field of Classification Search
CPC .......... F21V 21/22; F21V 21/24; F21V 21/26; F21V 29/50; F21V 23/007; F21V 14/02; F21S 4/28; A01G 9/24; A01G 9/249
See application file for complete search history.

(56) References Cited

U.S. PATENT DOCUMENTS

| | | | | |
|---|---|---|---|---|
| 10,918,021 | B1* | 2/2021 | Chen | F21S 4/28 |
| 2016/0003453 | A1* | 1/2016 | Klase | F21S 4/28 |
| | | | | 362/220 |
| 2017/0082270 | A1* | 3/2017 | Klase | F21S 8/066 |
| 2020/0053967 | A1* | 2/2020 | Murphy | H05B 45/20 |
| 2020/0375118 | A1* | 12/2020 | Lee | F21V 21/15 |
| 2021/0116108 | A1* | 4/2021 | Osborne | G03B 15/03 |
| 2021/0274721 | A1* | 9/2021 | Tsao | F21V 21/24 |

FOREIGN PATENT DOCUMENTS

CN 109442300 * 3/2019 ............. F21V 21/22

* cited by examiner

*Primary Examiner* — Zheng Song
(74) *Attorney, Agent, or Firm* — Leong C. Lei

(57) ABSTRACT

A telescopic plant light comprises a plurality of light bars and a drive device. The light bars are arranged side by side. Every adjacent two of the light bars are connected by a linkage telescopic mechanism to move toward each other or to move away from each other. The drive device is electrically connected to each of the light bars. Through the linkage telescopic mechanism connected between every adjacent two of the light bars, the distance between every adjacent two of the light bars is adjustable according to needs. In normal use, the distance between every adjacent two of the light bars can be increased. When not in use, the light bars are moved to be close together, so as to effectively reduce the space occupied by the product. It is convenient for storage, packaging and transportation. The product is very convenient to use.

8 Claims, 11 Drawing Sheets

TELESCOPIC PLANT LIGHT

BACKGROUND OF THE INVENTION

1. Field of the Invention

The present invention relates to a plant light, and more particularly to a telescopic plant light.

2. Description of the Prior Art

Plant lights are used for plants. Because plants need sunlight for photosynthesis, plant lights are configured to supplement light for plants or completely replace sunlight. The light sources suitable for plant supplementary light include high-pressure sodium lamps, metal-halide lamps, ceramic metal-halide lamps, microwave sulfur lamps, plasma lamps, fluorescent lamps, electrodeless lamps, tri-color rare-earth complementary light lamps, LED plant lamps, etc. The most commonly used lamps are sodium lamps, metal-halide lamps and LED plant lights for plant supplement light. Others are relatively seldom used or very expensive.

A conventional plant light is generally composed of multiple light bars arranged at intervals. These light bars are fixed to a retaining frame and cannot be detached, which makes the product occupy a larger space. It is very inconvenient to store, pack and transport when not in use. Therefore, it is necessary to improve the conventional plant light.

SUMMARY OF THE INVENTION

In view of the defects of the prior art, the primary object of the present invention is to provide a telescopic plant light, which can reduce the occupied space and is convenient for storage, packaging and transportation when not in use.

In order to achieve the above objects, the present invention adopts the following technical solutions:

A telescopic plant light comprises a plurality of light bars and a drive device. The light bars are arranged side by side. The light bars each extend longitudinally. Every adjacent two of the light bars are connected by a linkage telescopic mechanism to move toward each other or to move away from each other. The drive device is electrically connected to each of the light bars.

Preferably, the linkage telescopic mechanism includes four links. The four links are hinged in pairs and are respectively hinged to the corresponding light bars to form a parallelogram configuration.

Preferably, each of the light bars includes a light housing and a light panel. A top of the light housing is formed with an engaging groove extending longitudinally. The engaging groove is provided with a screw. The screw extends upwardly to be hinged with the corresponding links. A bottom of the light housing is formed with a mounting groove extending longitudinally. The light panel is fixed in the mounting groove.

Preferably, the light housing is made of a heat dissipation material. Two ends of the light housing are provided with end caps.

Preferably, the number of the light bars is six or eight. The linkage telescopic mechanism is plural. The links of every adjacent two of the linkage telescopic mechanisms are correspondingly hinged together.

Preferably, front and rear ends of every adjacent two of the light bars are each provided with the linkage telescopic mechanism. The drive device is located between the two linkage telescopic mechanisms arranged at the front and rear ends. The drive device is detachably connected to the corresponding light bars.

In an embodiment of the present invention, the drive device includes an outer casing and a driving power supply arranged in the outer casing. The outer casing extends transversely. Left and right ends of the outer casing are detachably connected to the first and last light bars, respectively. The driving power supply is electrically connected to the light bars.

In an embodiment of the present invention, the drive device includes a fixing plate and a driving power supply arranged on the fixing plate. The fixing plate extends transversely. Left and right ends of the fixing plate are detachably mounted to the first and last light bars, respectively. The driving power supply is electrically connected to the light bars.

In an embodiment of the present invention, the drive device includes a casing and a driving power supply arranged inside or outside the casing. The casing extends transversely. Left and right ends of the casing each have a connecting frame. The connecting frame is formed with a pair of through holes. A connecting pin is provided and connected to the pair of through holes. Two ends of the connecting pin each have a positioning protrusion. Two sides of either end of the casing are provided with fixing brackets, respectively. The fixing brackets are detachably connected to the first and last light bars, respectively. The fixing brackets each have a positioning hole. The two ends of the connecting pin respectively pass through the corresponding positioning holes of the fixing brackets and extend outwardly so that the positioning protrusions on the two ends of the connecting pin are located outside the fixing brackets, respectively. The driving power supply is electrically connected to the light bars.

Preferably, the fixing brackets each have a positioning piece bent and extending downwardly. The light bars are each formed with a positioning groove extending longitudinally. The positioning piece is inserted and positioned in the positioning groove.

Compared with the prior art, the present invention has obvious advantages and beneficial effects. Specifically, it can be known from the above technical solutions:

Through the linkage telescopic mechanism configured to connect every adjacent two of the light bars, the distance between every adjacent two of the light bars can be adjusted according to needs. In normal use, the distance between every adjacent two of the light bars can be increased. When not in use, the light bars are moved to be close together, so as to effectively reduce the space occupied by the product. It is convenient for storage, packaging and transportation. The product is very convenient to use.

Embodiments of the present invention will now be described, by way of example only, with reference to the accompanying drawings.

DETAILED DESCRIPTION OF THE PREFERRED EMBODIMENTS

Figure 1:
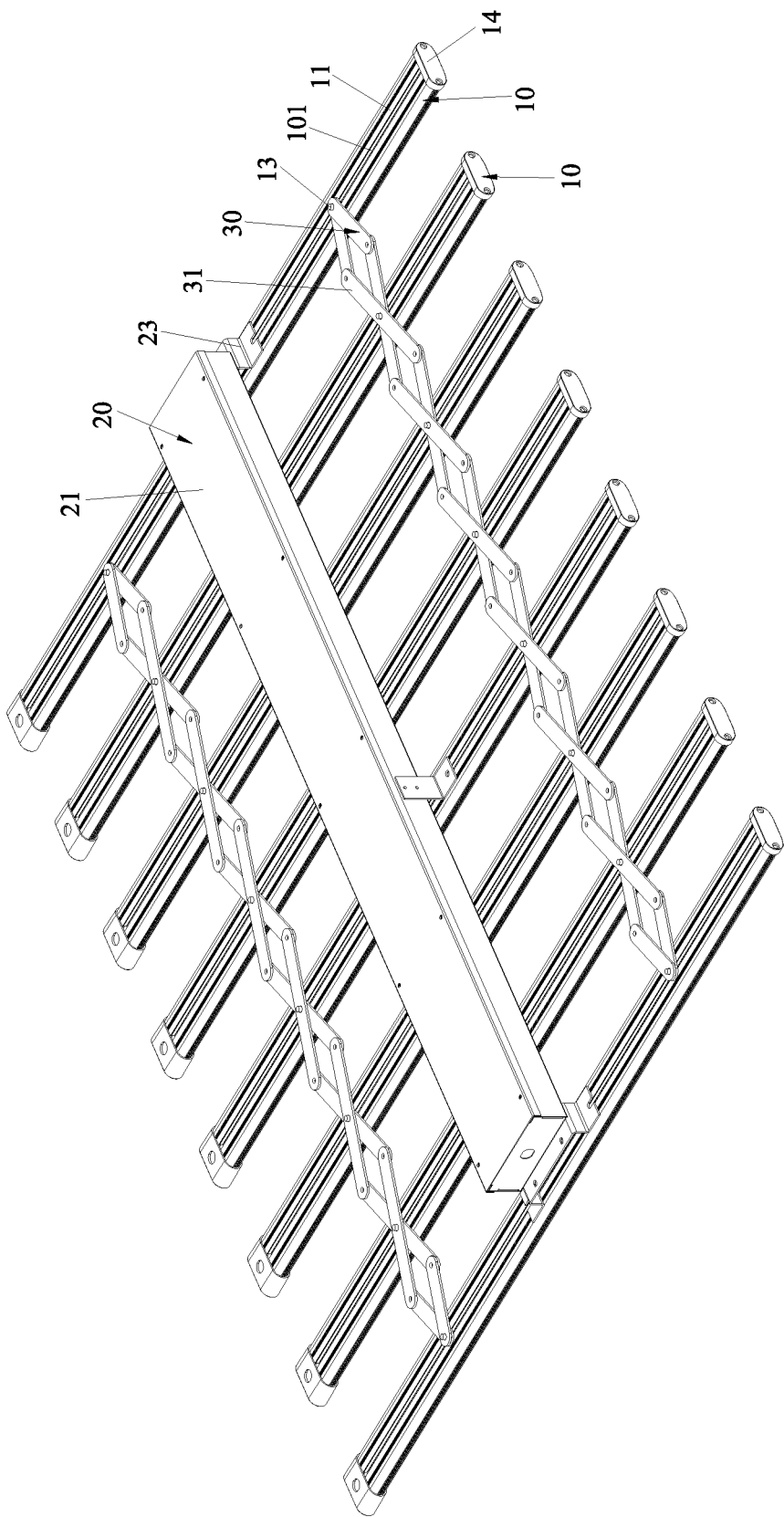
FIG. 1 is a perspective view according to a first embodiment of the present invention.
Figure 2:
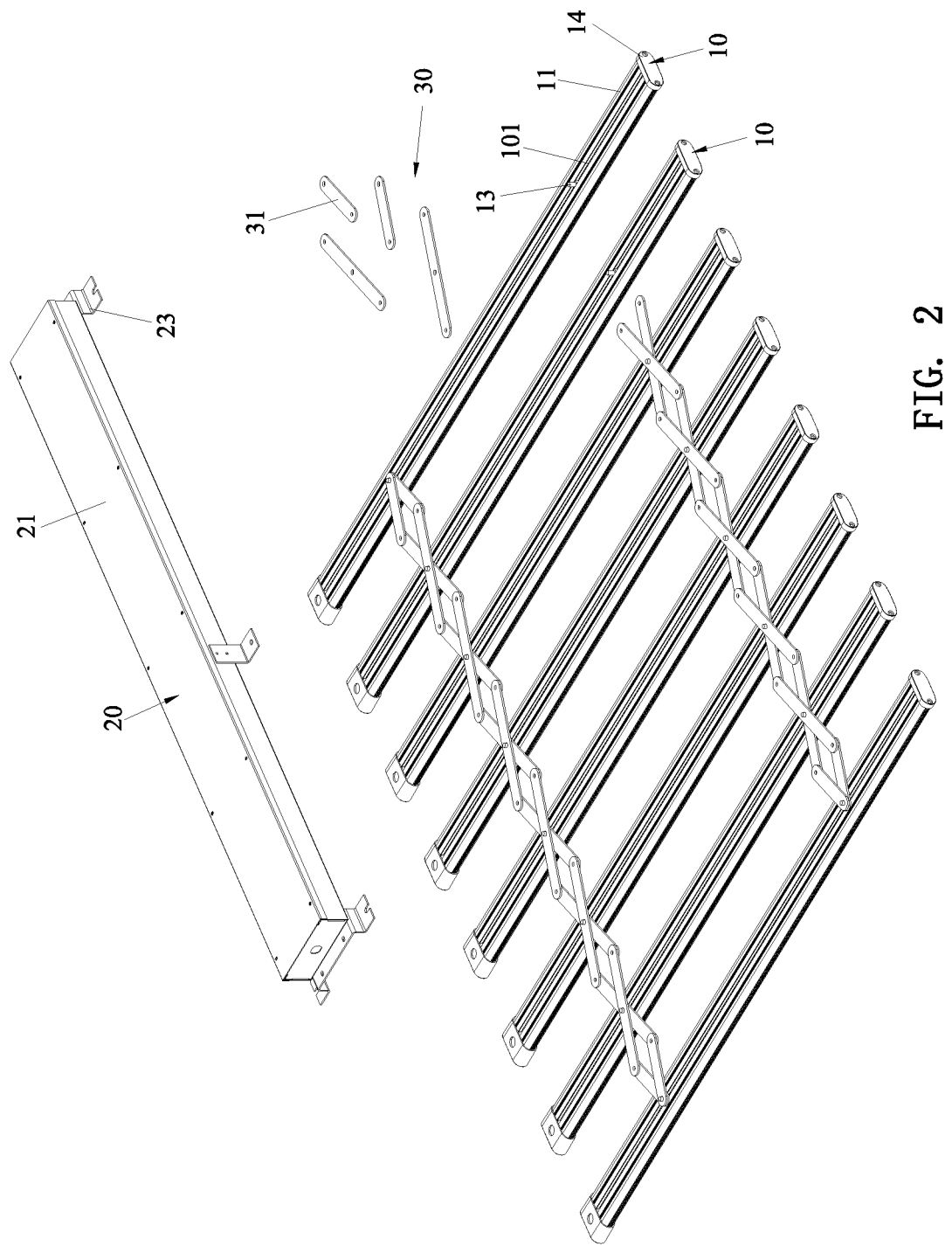
FIG. 2 is an exploded view according to the first embodiment of the present invention.
Figure 3:
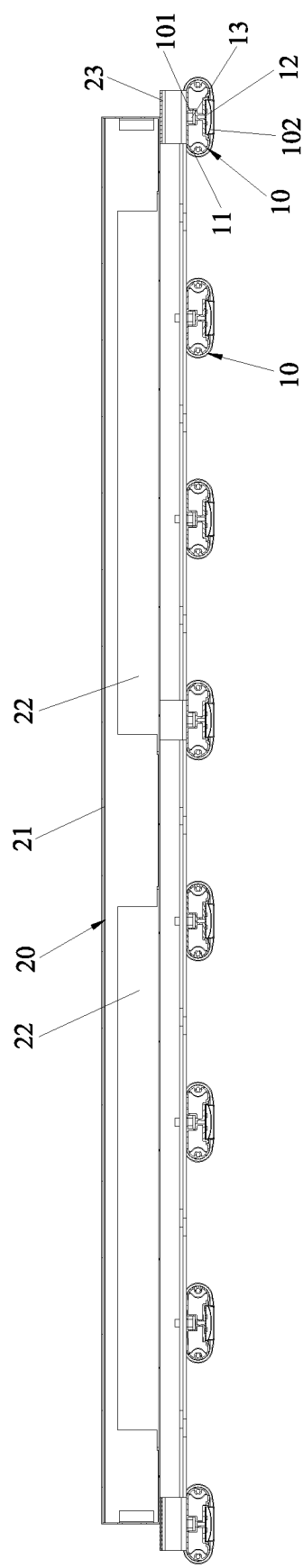
FIG. 3 is a cross-sectional view according to the first embodiment of the present invention.

Referring to FIGS. 1 to 4, the specific structure of a first embodiment of the present invention comprises a plurality of light bars 10 and a drive device 20.

The light bars 10 are arranged side by side. Each light bar 10 extends longitudinally. Every adjacent two of the light bars 10 are connected by a linkage telescopic mechanism 30 to move toward each other or to move away from each other. Specifically, in this embodiment, the light bar 10 includes a light housing 11 and a light panel 12. The top of the light housing 11 is formed with an engaging groove 101 extending longitudinally. The engaging groove 101 is provided with a screw 13. The screw 13 extends upwardly. The bottom of the light housing 11 is formed with a mounting groove 102 extending longitudinally. The light panel 12 is fixed in the mounting groove 102. The light housing 11 is made of a heat dissipation material. Two ends of the light housing 11 are provided with end caps 14. The linkage telescopic mechanism 30 includes four links 31. The four links 31 are hinged in pairs and are respectively hinged to the corresponding light bars 10 to form a parallelogram configuration. In this embodiment, the screw 13 is hinged to the corresponding links 31. The number of the light bars 10 is eight, so that the power of the product can reach 800 W. The linkage telescopic mechanism 30 is plural. The links 31 of every adjacent two of the linkage telescopic mechanisms 30 are correspondingly hinged together.

The drive device 20 is electrically connected to each of the light bars 10. In this embodiment, the front and rear ends of every adjacent two of the light bars 10 are each provided with the linkage telescopic mechanism 30. The drive device 20 is located between the two linkage telescopic mechanisms 30 arranged at the front and rear ends. The drive device 20 is detachably connected to the corresponding light bars 10. Specifically, the drive device 20 includes an outer casing 21 and a driving power supply 22 arranged in the outer casing 21. The outer casing 21 extends transversely. The left and right ends of the outer casing 21 are detachably connected to the first and last light bars 10, respectively. The driving power supply 22 is electrically connected to the light bars 10, and a plurality of brackets 23 are welded to the outer casing 21. Each bracket 23 is mounted to the corresponding light bar 10 by screws. The driving power supply 22 is plural. The plurality of driving power supplies 22 are electrically connected to the light panels 12 of the corresponding light bars 10, respectively.

Figure 4:
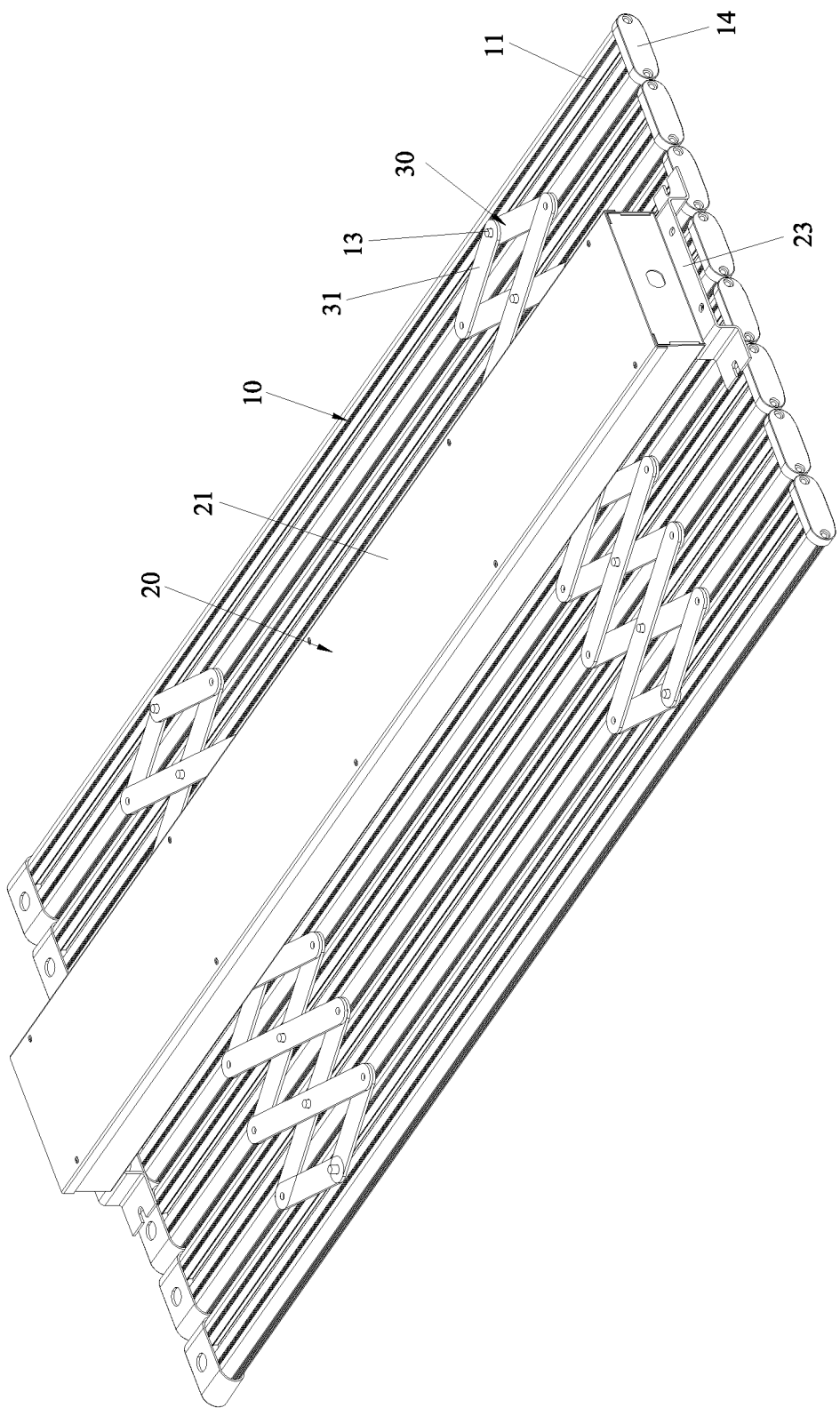
FIG. 4 is a perspective view according to the first embodiment of the present invention in a retracted state.

The use of this embodiment is described in detail as follows:

When in use, as shown in FIG. 1, every adjacent two of the light bars 10 are pulled to the maximum distance from each other. At this time, each link telescopic mechanism 30 is in a stretched state. Then, the two ends of the drive device 20 are mounted to the first and last light bars 10, respectively. At this time, the overall structure of the product is fixed, the product can be installed externally, and the drive device 20 can be used when the power is turned on. When not in use, as shown in FIG. 4, the drive device 20 is removed, and then the light bars 10 are moved to approach each other towards the middle. At this time, each linkage telescopic mechanism 30 is in a retracted state, and the light bars 10 are moved to approach each other. Then, the drive device 20 is stacked on the light bars 10 to facilitate storage and reduce the space occupied by the product.

Figure 5:
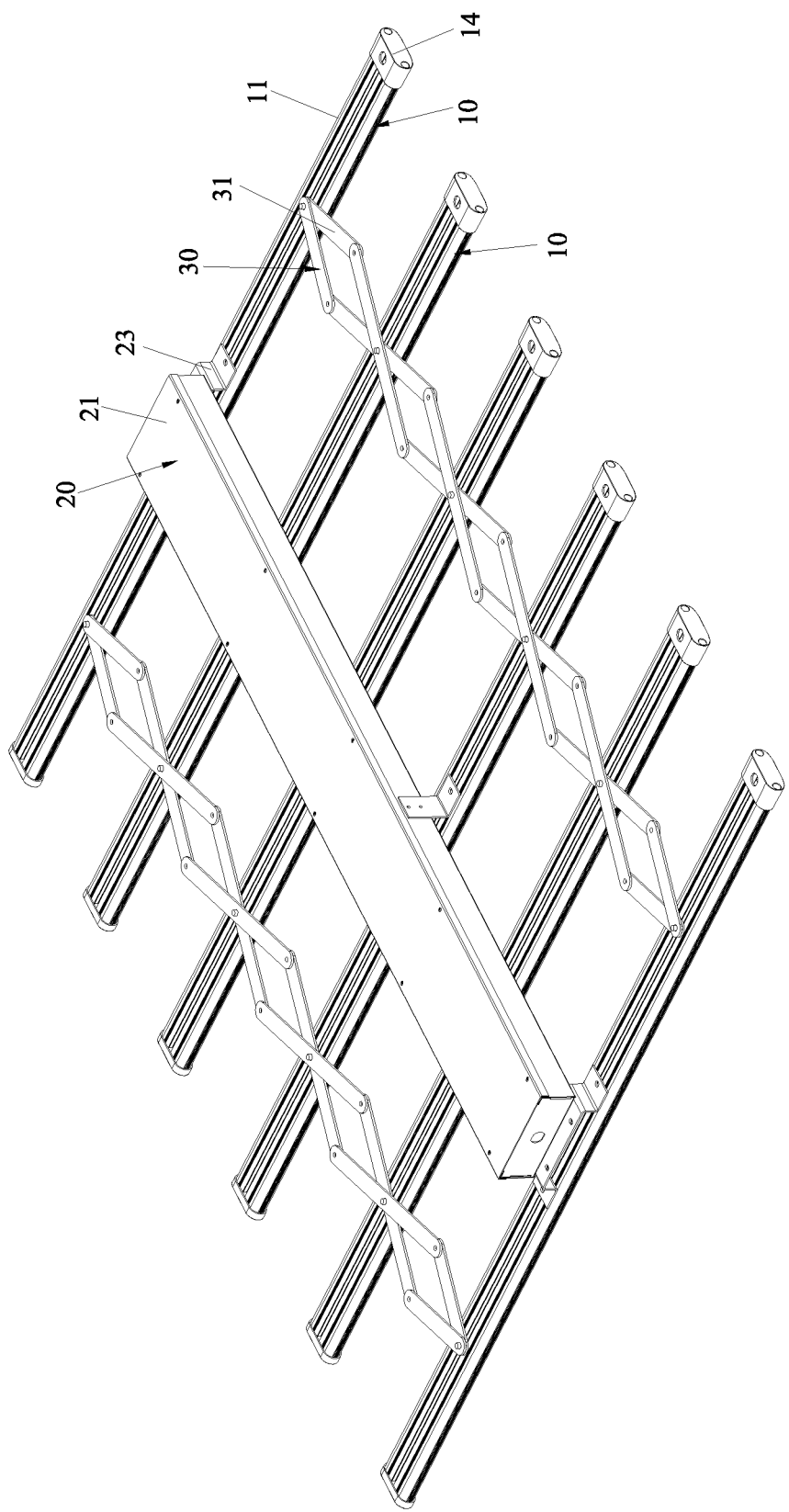
FIG. 5 is a perspective view according to a second embodiment of the present invention.

FIG. 5 illustrates the specific structure of a second embodiment of the present invention. The second embodiment is substantially similar to the first embodiment with the exceptions described hereinafter.

In this embodiment, the telescopic plant light includes six light bars. The power of the product in this embodiment is 600 W.

The use of this embodiment is the same as that of the first embodiment, so the use of this embodiment will not be described in detail hereinafter.

Figure 6:
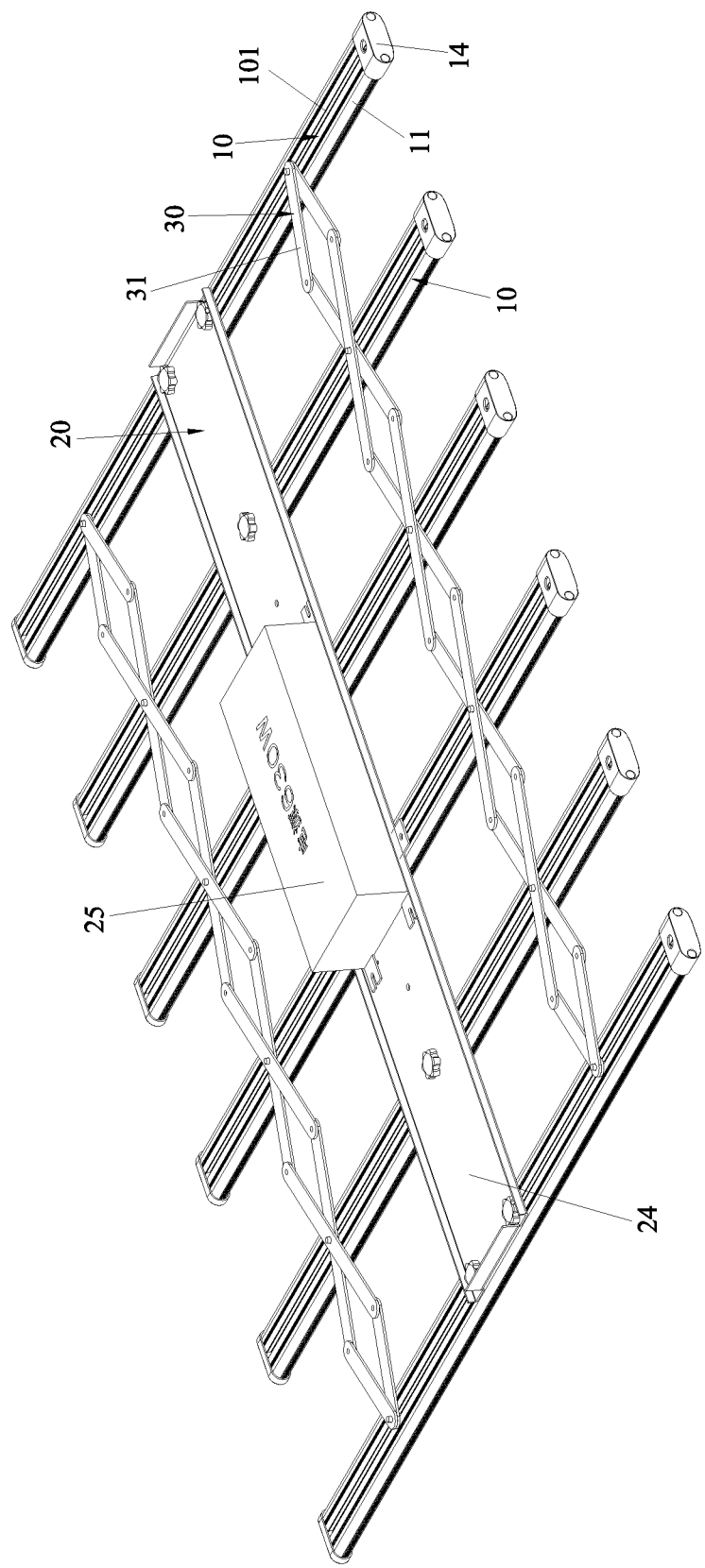
FIG. 6 is a perspective view according to a third embodiment of the present invention.

FIG. 6 illustrates the specific structure of a third embodiment of the present invention. The third embodiment is substantially similar to the second embodiment with the exceptions described hereinafter.

In this embodiment, the drive device 20 includes a fixing plate 24 and a driving power supply 25 arranged on the fixing plate 24. The fixing plate 24 extends transversely. The left and right ends of the fixing plate 24 are detachably mounted to the first and last light bars 10, respectively. The driving power supply 25 is electrically connected to the light bars 10.

The use of this embodiment is the same as that of the second embodiment, so the use of this embodiment will not be described in detail hereinafter.

Figure 7:
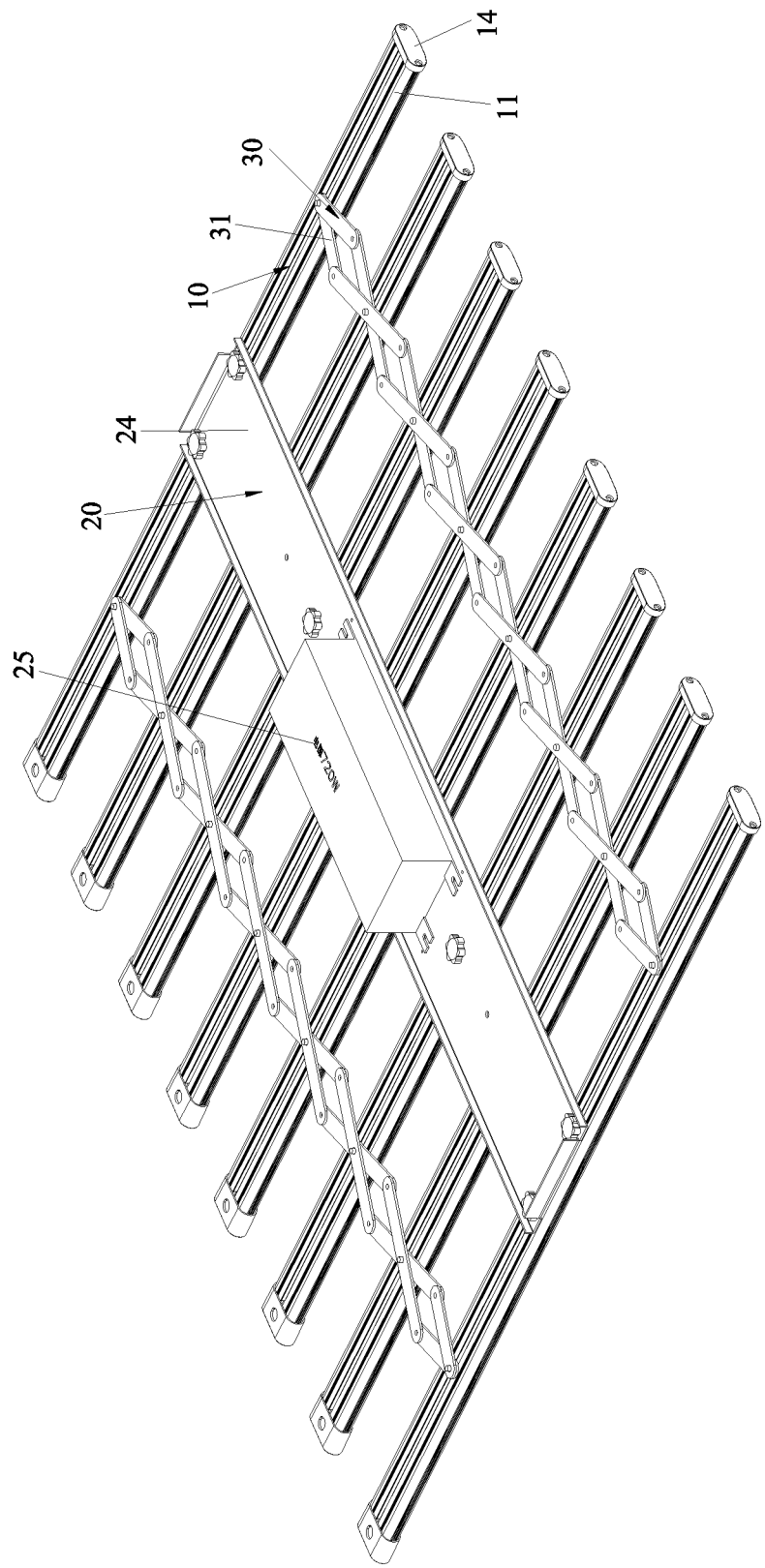
FIG. 7 is a perspective view according to a fourth embodiment of the present invention.

FIG. 7 illustrates the specific structure of a fourth embodiment of the present invention. The fourth embodiment is substantially similar to the first embodiment with the exceptions described hereinafter.

In this embodiment, the drive device 20 includes a fixing plate 24 and a driving power supply 25 arranged on the fixing plate 24. The fixing plate 24 extends transversely. The left and right ends of the fixing plate 24 are detachably mounted to the first and last light bars 10, respectively. The driving power supply 25 is electrically connected to the light bars 10.

The use of this embodiment is the same as that of the second embodiment, so the use of this embodiment will not be described in detail hereinafter.

Figure 8:
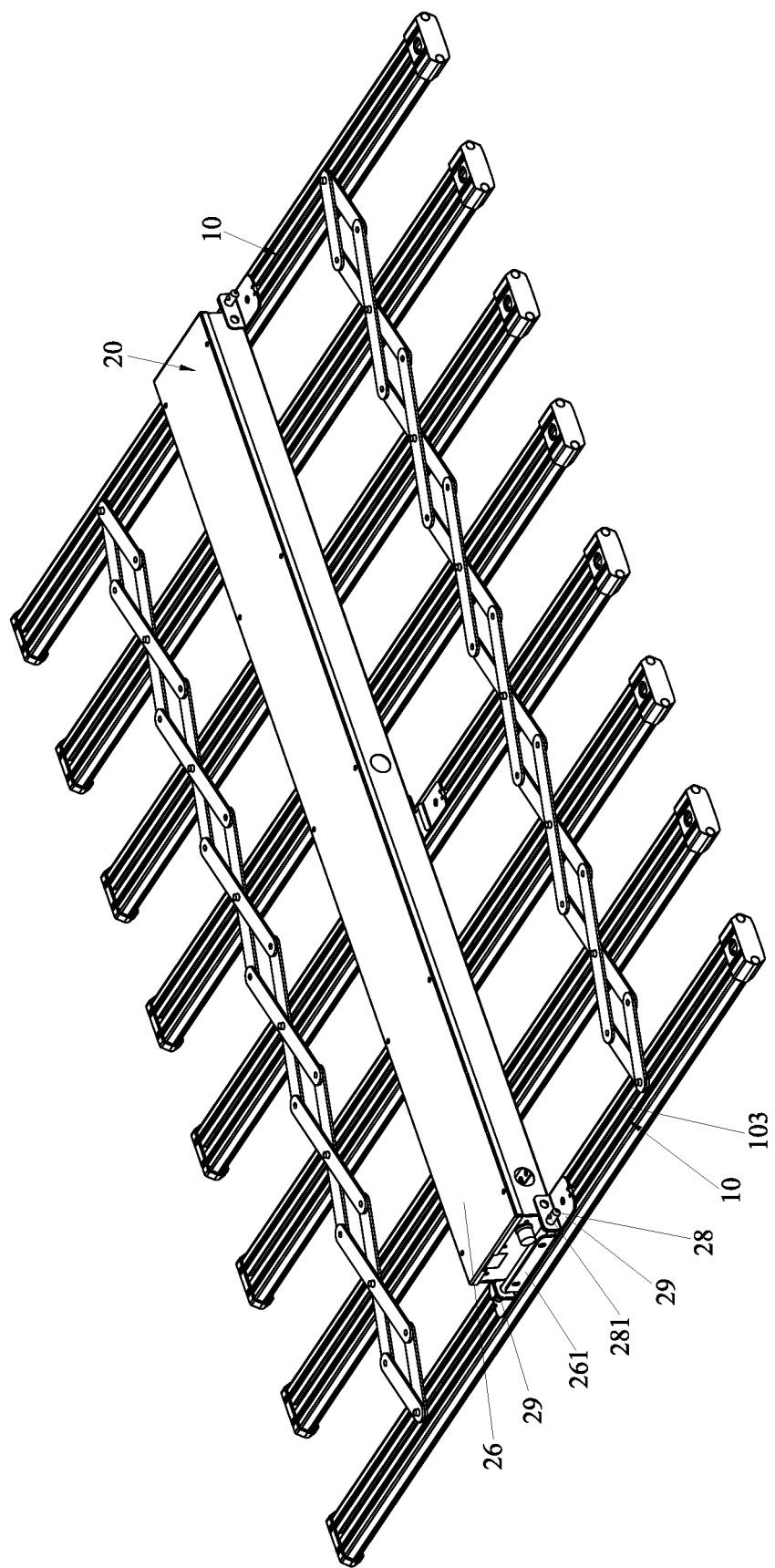
FIG. 8 is a perspective view according to a fifth embodiment of the present invention.
Figure 9:
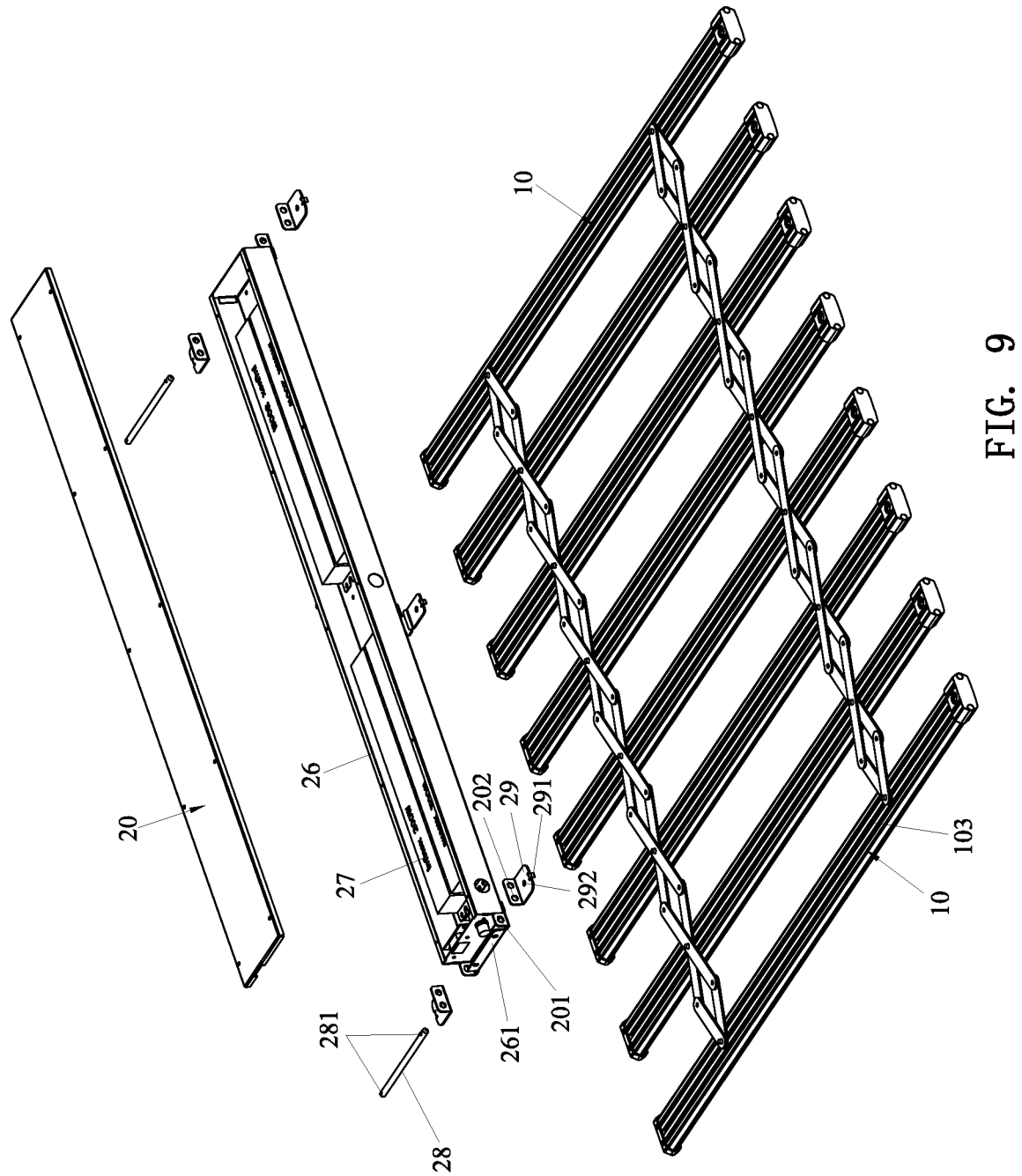
FIG. 9 is an exploded view according to the fifth embodiment of the present invention.

FIG. 8 and FIG. 9 illustrate the specific structure of a fifth embodiment of the present invention. The fifth embodiment is substantially similar to the first embodiment with the exceptions described hereinafter.

In this embodiment, the drive device 20 includes a casing 26 and a driving power supply 27 arranged in the casing 26. The casing 26 extends transversely. The left and right ends of the casing 26 each have a connecting frame 261. The connecting frame 261 is formed with a pair of through holes 201. A connecting pin 28 is provided and connected to the pair of through holes 201. Two ends of the connecting pin 28 each have a positioning protrusion 281. Two sides of either end of the casing 26 are provided with fixing brackets 29, respectively. The fixing brackets 29 are detachably connected to the first and last light bars 10, respectively. The fixing brackets 29 each have a positioning hole 202. The two ends of the connecting pin 28 respectively pass through the corresponding positioning holes 202 of the fixing brackets 29 and extend outwardly, so that the positioning protrusions 281 on the two ends of the connecting pin 28 are located outside the fixing brackets 29, respectively. The driving power supply 27 is electrically connected to the light bars 10. The driving power supply 27 includes four driving power supplies. Furthermore, the fixing brackets 29 each have a positioning piece 291 bent and extending downwardly. The light bar 11 is formed with a positioning groove 103 extending longitudinally. The positioning piece 291 is inserted and positioned in the positioning groove 103. The fixing bracket 29 further has a fixing hole 292 for a screw to fix the fixing bracket 29 to the corresponding light bar 10. When disassembled, the connecting pin 28 is pulled out, and then the casing 26 together with the driving power supplies 27 in the casing 26 is removed. When assembled, the casing 26 is placed in the corresponding position, and then the connecting pin 28 is connected. The operation for disassembly and assembly is easier.

The use of this embodiment is the same as that of the first embodiment, so the use of this embodiment will not be described in detail hereinafter.

Figure 10:
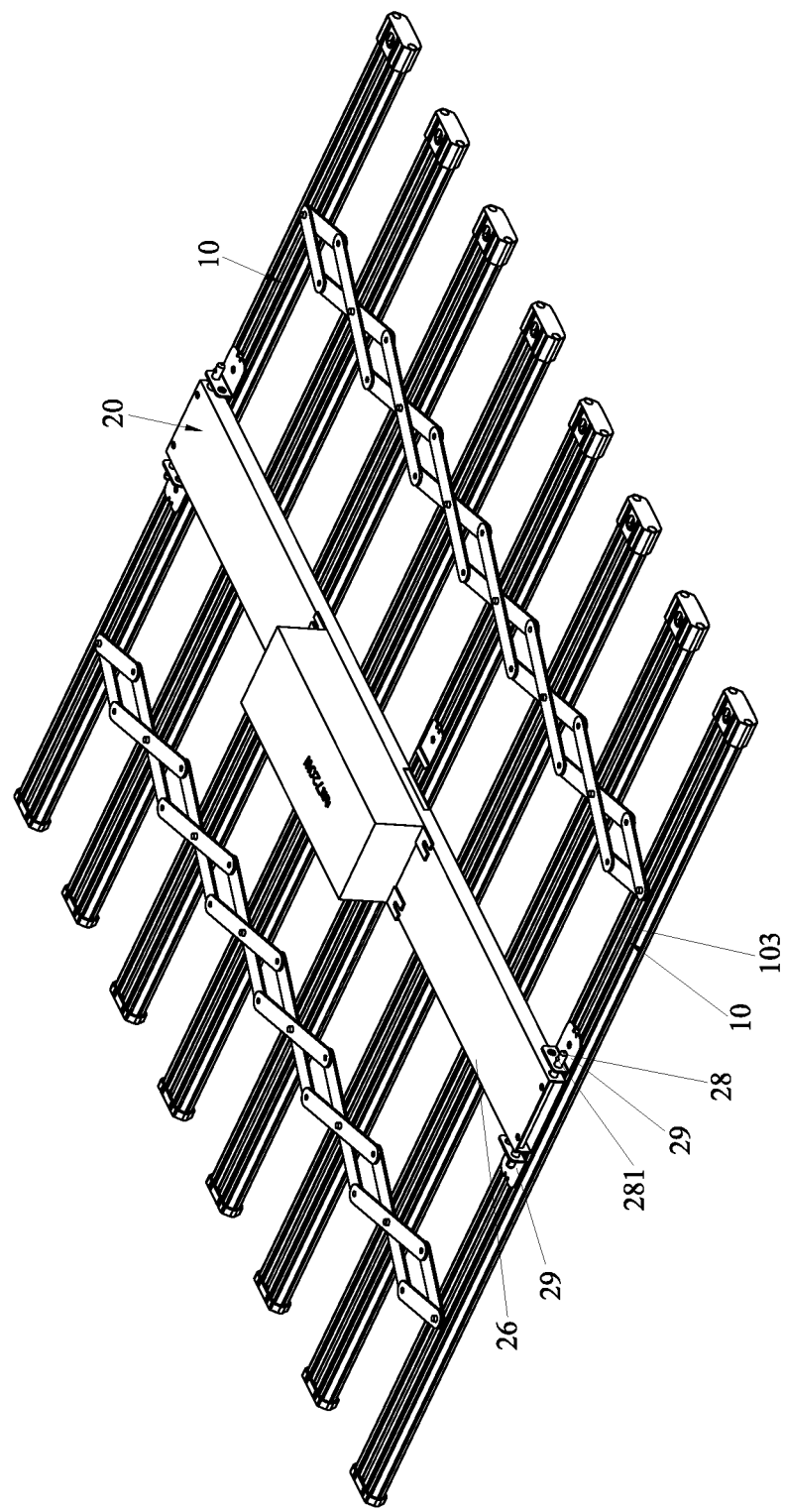
FIG. 10 is a perspective view according to a sixth embodiment of the present invention.
Figure 11:
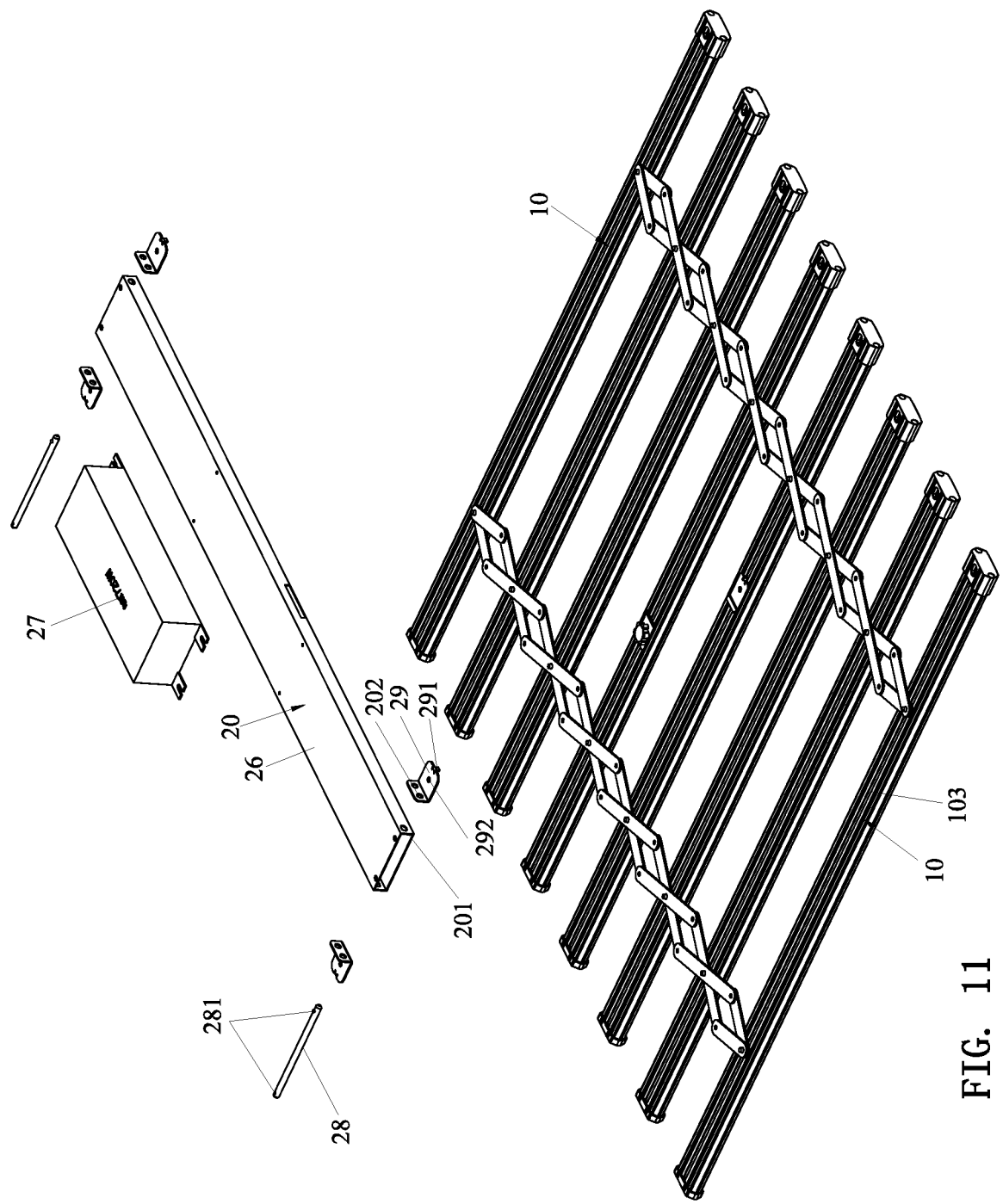
FIG. 11 is an exploded view according to the sixth embodiment of the present invention.

FIG. 10 and FIG. 11 illustrate the specific structure of a sixth embodiment of the present invention. The sixth embodiment is substantially similar to the fifth embodiment with the exceptions described hereinafter.

In this embodiment, the casing 26 has a flat tubular configuration. The driving power supply 27 is arranged outside the casing 26, and the driving power supply 27 is a single driving power supply.

The use of this embodiment is the same as that of the fifth embodiment, so the use of this embodiment will not be described in detail hereinafter.

The feature of the present invention is that through the linkage telescopic mechanism connected between every adjacent two of the light bars, the distance between every adjacent two of the light bars can be adjusted according to needs. In normal use, the distance between every adjacent two of the light bars can be increased. When not in use, the light bars are moved to approach each other, so as to effectively reduce the space occupied by the product. It is convenient for storage, packaging and transportation. The product is very convenient to use.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A telescopic plant light, comprising a plurality of light bars and a drive device; the light bars being arranged side by side, the light bars each extending longitudinally, every adjacent two of the light bars being connected by a linkage telescopic mechanism to move toward each other or to move away from each other; the drive device being electrically connected to each of the light bars; wherein the linkage telescopic mechanism includes four links, the four links are hinged in pairs and are respectively hinged to the corresponding light bars to form a parallelogram configuration; wherein each of the light bars includes a light housing and a light panel, a top of the light housing is formed with an engaging groove extending longitudinally, the engaging groove is provided with a screw, the screw extends upwardly to be hinged with the corresponding links, a bottom of the light housing is formed with a mounting groove extending longitudinally, and the light panel is fixed in the mounting groove.

2. The telescopic plant light as claimed in claim 1, wherein the drive device includes a casing and a driving power supply arranged inside or outside the casing, the casing extends transversely, left and right ends of the casing each have a connecting frame, the connecting frame is formed with a pair of through holes, a connecting pin is provided and connected to the pair of through holes, two ends of the connecting pin each have a positioning protrusion, two sides of either end of the casing are provided with fixing brackets respectively, the fixing brackets are detachably connected to the first and last light bars respectively, the fixing brackets each have a positioning hole, the two ends of the connecting pin respectively pass through the corresponding positioning holes of the fixing brackets and extend outwardly so that the positioning protrusions on the two ends of the connecting pin are located outside the fixing brackets respectively, and the driving power supply is electrically connected to the light bars.

3. The telescopic plant light as claimed in claim 2, wherein the fixing brackets each have a positioning piece bent and extending downwardly, the light bars are each formed with a positioning groove extending longitudinally, and the positioning piece is inserted and positioned in the positioning groove.

4. The telescopic plant light as claimed in claim 1, wherein the light housing is made of a heat dissipation material, and two ends of the light housing are provided with end caps.

5. The telescopic plant light as claimed in claim 1, wherein the number of the light bars is six or eight, the linkage telescopic mechanism is plural, and the links of every adjacent two of the linkage telescopic mechanisms are correspondingly hinged together.

6. The telescopic plant light as claimed in claim 1, wherein front and rear ends of every adjacent two of the light bars are each provided with the linkage telescopic mechanism, the drive device is located between the two linkage telescopic mechanisms arranged at the front and rear ends, and the drive device is detachably connected to the corresponding light bars.

7. The telescopic plant light as claimed in claim 1, wherein the drive device includes an outer casing and a driving power supply arranged in the outer casing, the outer casing extends transversely, left and right ends of the outer casing are detachably connected to the first and last light bars respectively, and the driving power supply is electrically connected to the light bars.

8. The telescopic plant light as claimed in claim 1, wherein the drive device includes a fixing plate and a driving power supply arranged on the fixing plate, the fixing plate extends transversely, left and right ends of the fixing plate are detachably mounted to the first and last light bars respectively, and the driving power supply is electrically connected to the light bars.

* * * * *